United States Patent [19]

Luscombe et al.

[11] 4,389,648
[45] Jun. 21, 1983

[54] DOPPLER RADAR SYSTEM

[75] Inventors: Anthony P. Luscombe, Chelmsford; Seville R. Brooks, Ongar, both of England

[73] Assignee: The Marconi Company Limited, Chelmsford, England

[21] Appl. No.: 173,912

[22] Filed: Jul. 30, 1980

[30] Foreign Application Priority Data

Jul. 31, 1979 [GB] United Kingdom ............... 7926636

[51] Int. Cl.³ .............................................. G01S 13/60
[52] U.S. Cl. ..................................... 343/8; 343/5 SA
[58] Field of Search .............................. 343/5 SA, 8

[56] References Cited

U.S. PATENT DOCUMENTS

| | | | |
|---|---|---|---|
| 3,072,900 | 1/1963 | Beck | 343/8 |
| 3,113,308 | 12/1963 | Stavis | 343/8 |
| 3,372,389 | 3/1968 | Bellman et al. | 343/8 |
| 3,430,236 | 2/1969 | Gamertsfelder | 343/8 X |
| 3,701,989 | 10/1972 | Calhoon, Sr. et al. | 343/8 X |
| 3,772,689 | 11/1973 | Root, Jr. | 343/5 SA X |
| 3,896,434 | 7/1975 | Sirven | 343/5 SA |
| 4,005,417 | 1/1977 | Collins | 343/5 SA |
| 4,177,463 | 12/1979 | Andermo | 343/8 |
| 4,319,245 | 3/1982 | Mawhinney | 343/8 |

*Primary Examiner*—T. H. Tubbesing
*Attorney, Agent, or Firm*—Spencer & Kaye

[57] ABSTRACT

In a Doppler radar system any one received signal contains components having different Doppler frequencies. This is because the received signal is derived from reflections off a range of different positions within the beamwidth of the system.

It is often only that frequency component which is derived from a reflection along the boresight of the system which is of interest. Difficulty arises in determining which component this is. Because of variations of the reflective properties of the surface from which the reflections are received, it cannot correctly be assumed to be the strongest component.

The invention identifies the components of the received signals derived from reflections along the boresight of the system by analyzing each of two signals received at different times, into components having different Doppler shifts. Values are then calculated of the relative strengths (e.g. ratios or differences) of components of the two signals derived from reflections off the same position. These relative strength values are not greatly affected by variations in the reflection properties of the surface and can be used to determine accurately the frequency components of the signals derived from the boresight.

10 Claims, 15 Drawing Figures

DOPPLER RADAR SYSTEM

BACKGROUND OF THE INVENTION

This invention relates to a Doppler radar system, i.e. a radar system which derives information by observing the Doppler frequency shift of electromagnetic or other signals received after reflection from an object, there being relative motion between that object and an antenna of the radar system.

FIG. 1 depicts schematically an airborne radar system 1 travelling horizontally at velocity V over an area of land 2 and water 3. (In other applications the radar system could be carried by a space-craft and be travelling over the surface of the earth or an extraterrestrial body.) The radar system 1 has a transmit/receive antenna (not shown) whose boresight 4 is aligned with a point 5 on the ground. However, signals are received, at any one instant, from points spread over a finite area of the earth's surface. The amplitude components of the received signal from respective different points on the surface vary according to the polar diagram of the antenna. FIG. 1 illustrates schematically the main lobe and the two adjacent side lobes of the antenna, the beamwidth being grossly exaggerated on FIG. 1 for the purposes of explanation.

Thus, at the instant depicted in FIG. 1, the received signal has a component derived from a reflection at the point 6 on the sea surface immediately beneath the radar, from point 7 on the water/land boundary, and of course from the point 5 on the boresight of the antenna. Signal components received from these different points have different Doppler frequencies and it is desirable to establish what Doppler frequency is associated with the signal components received from point 5 on the antenna boresight. The frequency associated with such points on the antenna boresight is called the "center frequency." Having established the center frequency it is possible to filter from the received signal the component arising from reflections solely from the boresight of the antenna. This is useful for ground mapping purposes and in systems for measuring the velocity of an aircraft relative to the ground. It gives the radar good resolution.

If it could be assumed that all parts of the surface 2 had the same reflection properties it would be a simple matter to find the center frequency since this would be the frequency at which the received signal is strongest. The relationship of the Doppler frequency to the power of the components of the received signals having that Doppler frequency would be as shown in FIG. 2, the shape of this function depending entirely on the gain characteristics of the antenna. It should be noted from FIG. 2 that the center frequency $f_5$ is coincident with the point of maximum amplitude of the received signal.

However, the amplitude of any particular frequency component of the received signal will be dependent on the reflection properties of the associated point on the surface 2 or 3 and noise. Thus, if the noise were constant for all frequencies, the theoretical relationship of FIG. 2 would be modified as shown in FIG. 3. Here there can be seen a discontinuity at frequency $f_7$ caused by the water/land boundary at 7. This discontinuity displaces the maximum of the curve to the position $f_7$ and so it could be assumed incorrectly that $f_7$ is the center frequency. In a mapping radar this assumption would lead to inaccuracies at the very times when features of special significance are being observed. An object of this invention is to overcome this problem.

SUMMARY OF THE INVENTION

The invention provides a Doppler radar system including means for receiving at least two signals reflected at different times from a common range of target positions; means for analyzing each signal into components having different Doppler shifts; means for calculating, for each said position, a value constituting a measure of the relative strengths of those components of the two signals which are derived from reflections off that position; and selecting means for using the calculated values to select components of the signals derived from reflections in a particular direction or range of directions relative to the radar system.

The aforementioned values of the relative strengths can be calculated as ratios of the strengths, differences of the strengths or as some more complicated function provided it constitutes a measure of strength of one relative to the other. These calculated values are relatively independent of the reflective properties of the ground surface and can therefore be used reasonably reliably to identify the center frequency.

For example, when ratio values are calculated it can be shown (an explanation will follow) that, when the said predetermined value of the ratio is unity, the two components are derived from reflections off positions on the boresight of the antenna. Thus, by rejecting all signal components for which the ratio is not within a limited range including unity the performance of the system is greatly enhanced.

When the difference in the strength of the two components is considered (instead of the ratio) it can be shown that, when the difference value is zero, the two components are similarly derived from reflections off points on the boresight of the antenna. Thus, performance can likewise be enhanced by rejecting all signal components for which the said difference is not with a limited range including zero.

In order to calculate the ratio or difference or other relative strength value referred to above it is necessary to know which component of one of the two signals is derived from a reflection off the same point as a particular component of the other signal. This is a simple matter since, given the velocity of the radar system, it can be shown that signal components derived from the same point have a substantially constant frequency difference.

Referring now to FIG. 4, this shows the frequency spectrum of a second signal, received shortly after the first signal whose spectrum is shown in FIG. 3. It will be observed that the spectra of FIGS. 3 and 4 are similar but that the discontinuity has, in FIG. 4, been shifted to a lower frequency value. The frequency difference between the two discontinuities of FIGS. 3 and 4 can easily be calculated knowing the velocity of the radar system and the time difference between the two signals. It is therefore possible to shift the spectrum of FIG. 3 down in frequency by half this frequency difference and to shift the spectrum of FIG. 4 up in frequency, also by half the frequency difference, so that the two discontinuities are coincident in frequency. This situation is shown in FIG. 5 where it can be assumed that any of the two signal components having the same Doppler frequency are derived from reflections off the same point.

FIG. 6 shows the relationship between frequency and the ratio of the two power spectra of FIG. 5. It will be noted that this curve crosses the point where the ratio is unity at the frequency which is characteristic of signal components derived from reflections off position 5, on the boresight of the antenna.

FIG. 7 shows the relationship between frequency and the difference of the two curves indicated in FIG. 5. It will be noted that the curve of FIG. 7 crosses the x axis also at frequency $f_5$, which frequency is representative of signal components derived from the boresight of the antenna. Thus, by identifying those components whose ratio is in a region of unity or whose difference is in a region of zero it is possible to isolate the components of the received signal derived from the boresight of the antenna.

It is better, instead of identifying the components which give a relative strength value equal to one, zero or some other particular value, to compare the spectrum of relative strength values with a reference spectrum and to derive the center frequency from the comparison.

From the foregoing qualitative description it is not immediately clear why the crossing point of the two curves shown on FIG. 5 occurs at frequency $f_5$. In order to consider this, it is necessary to treat the matter mathematically.

Considering the situation at two different times $t_1$ and $t_2$: corresponding to FIGS. 3 and 4 respectively, separated by an interval T which is sufficiently short to ensure that echoes from the same points (e.g. points 5, 6 and 7) are received at the two times $t_1$ and $t_2$:

$$P(f, t_1) = P_o \sigma(f, t_1) G_f + N \qquad 1$$

$$P(f, t_2) = P_o \sigma(f, t_2) G_f + N \qquad 2$$

where:
$P(f, t)$ is the power of the received signal at frequency f and time t;
$P_o$ is a constant;
$\sigma(f,t)$ is a measure of the reflectivity of the surface for a component of the received signal of frequency f received at time t;
$G_f$ is the transmission plus reception gain of the antenna in the direction corresponding to Doppler frequency f; and N is a noise value.

Assuming that the main lobe of the antenna has a narrow beamwidth the Doppler frequency from any particular point can be assumed to change at an approximately constant rate. It follows that, during the interval T, there will be a uniform frequency shift $f_D$ for each point on the power spectrum of FIG. 3. Thus, $$\sigma(f, t_2) = \sigma(f - f_D, t_1) \qquad 3$$

If the two spectra given by equations 1 and 2 are processed by (a) subtracting the noise N from both spectra and (b) shifting the first spectrum (equation 1) up in frequency by $f_D/2$ and (c) shifting the second spectrum (equation 2) down in frequency by $f_D/2$, then the resulting spectra are given by the following equations.

$$P(f, t_1) = P_o \sigma(f - f_D/2, t_1) G(f - f_D/2) \qquad 4$$

$$P(f, t_2) = P_o \sigma(f + f_D/2, t_2) G(f + f_D/2) \qquad 5$$

But, from equation 3 it follows that $$\sigma(f - f_D/2, t_1) = \sigma(f + f_D/2, t_2) \qquad 6$$

Therefore the ratio $R_f$ between the two power values given by equations 4 and 5 is:

$$R_f = \frac{G(f - f_D/2)}{G(f + f_D/2)} \qquad 7$$

The ratio $R_f$ is thus independent of the unknown variable $\sigma$ and can be used to estimate the center frequency as follows. When f equals $f_C$, from equation 7;

$$R_f = \frac{G(f_C - f_D/2)}{G(f_C + f_D/2)} \qquad 8$$

If the beam is symmetrical about its center:

$$G(f_C - f_D/2) = G(f_C + f_D/2) \qquad 9$$

Therefore, from equation 8, $R_f = 1$.

Thus the ratio $R_f = 1$ at the center frequency. The latter can therefore be estimated by looking at the values of $R_f$ for different frequencies and finding the frequency at which it is substantially unity.

It would be possible, instead of moving each spectrum by $F_D/2$, to move one spectrum by $f_D$ or to take some other measures between these two extremes, e.g. by moving one spectrum by $f_D/4$ and the other by $3f_D/4$. In that case the center frequency will be that frequency for which $R_f$ equals some value other than 1.

Instead of looking at the ratio $R_f$ it is possible to obtain an estimate of the center frequency by looking at the difference $D_f$ between the two power values given by equations 4 and 5.

The value of $D_f$ is given by the equation:

$$D_f = P_o \sigma(f - f_D/2, t_1) G(f - f_D/2) - P_o \sigma(f + f_D/2, t_2) G(f + f_D/2) \qquad 10$$

As shown previously, because the beam is symmetrical, the two sigma components are equal at the center frequency. Therefore $D_f = 0$ when $G(f - f_D/2) = G(f + f_D/2)$ i.e. at the center frequency.

The center frequency can therefore be estimated by looking at the values of $D_f$ for different frequencies and finding the frequency value at which $D_f$ is substantially zero.

DESCRIPTION OF THE PREFERRED EMBODIMENT

Figure 8:
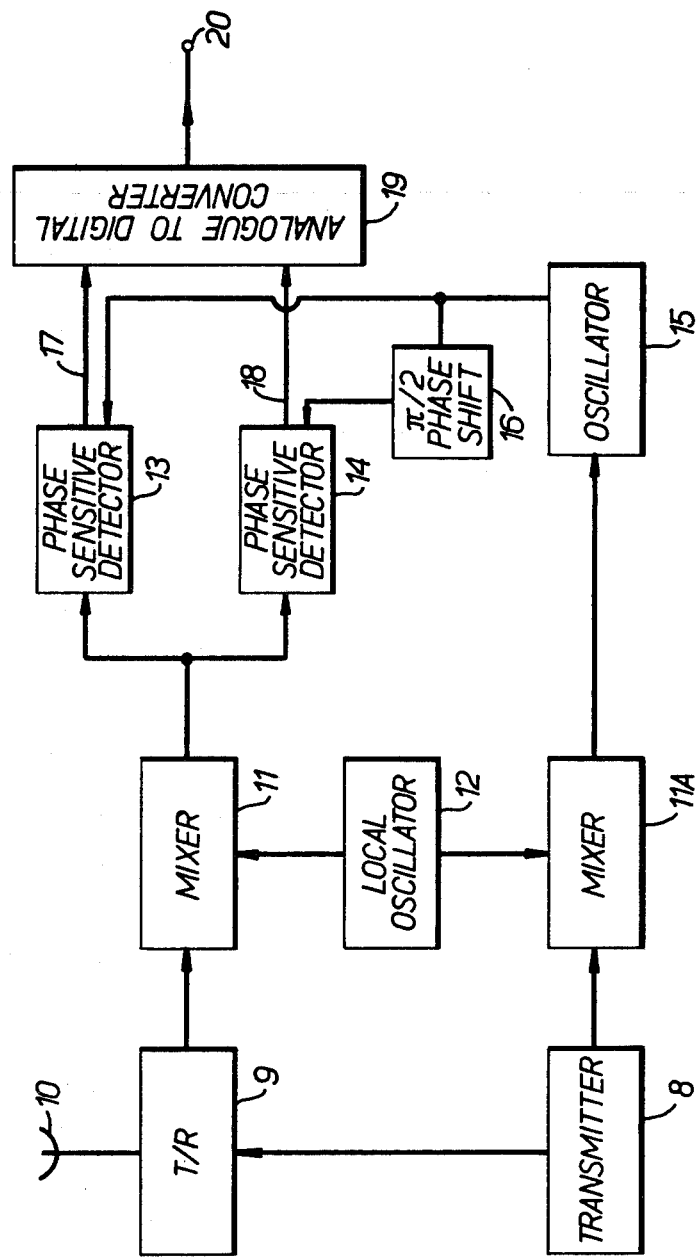
FIGS. 8 and 9 together constitute a block diagram of a radar system constructed in accordance with the invention.

Referring firstly to FIG. 8, a transmitter 8 generates pulses which pass through T/R cell 9 to an antenna 10 from which they are radiated. Pulses received by the antenna 10 after reflection from the ground surface or other object under investigation are directed by the cell 9 to a mixer 11 where the received signals are mixed with the output of a local oscillator 12. The output of the mixer 11 is passed to two phase sensitive detectors 13 and 14 one of which receives its reference directly from an oscillator 15 whilst the other receives a similar signal shifted in phase by 90° by the circuit 16. The oscillator 15 is locked to the output of a mixer 11A connected to receive outputs from the local oscillator 12 and the transmitter 8.

The outputs of detectors 13 and 14 thus constitute respectively the component of the received signal which is in phase with the transmitter (this will be termed the "real" component) and the component of the received signal which is in phase quadrature with the transmitted signal (this will be termed the "imaginary" component).

The real and imaginary components of the received signal on lines 17 and 18 are fed to an analog to digital converter 19 which samples consecutive short periods of the signals 17 and 18 and, for each said period produces a first train of digital pulses representing the amplitude of the real component and a second train of digital pulses representing the amplitude of the imaginary component. These two trains of pulses are passed to terminal 20 which is also shown on FIG. 9.

Figure 9:
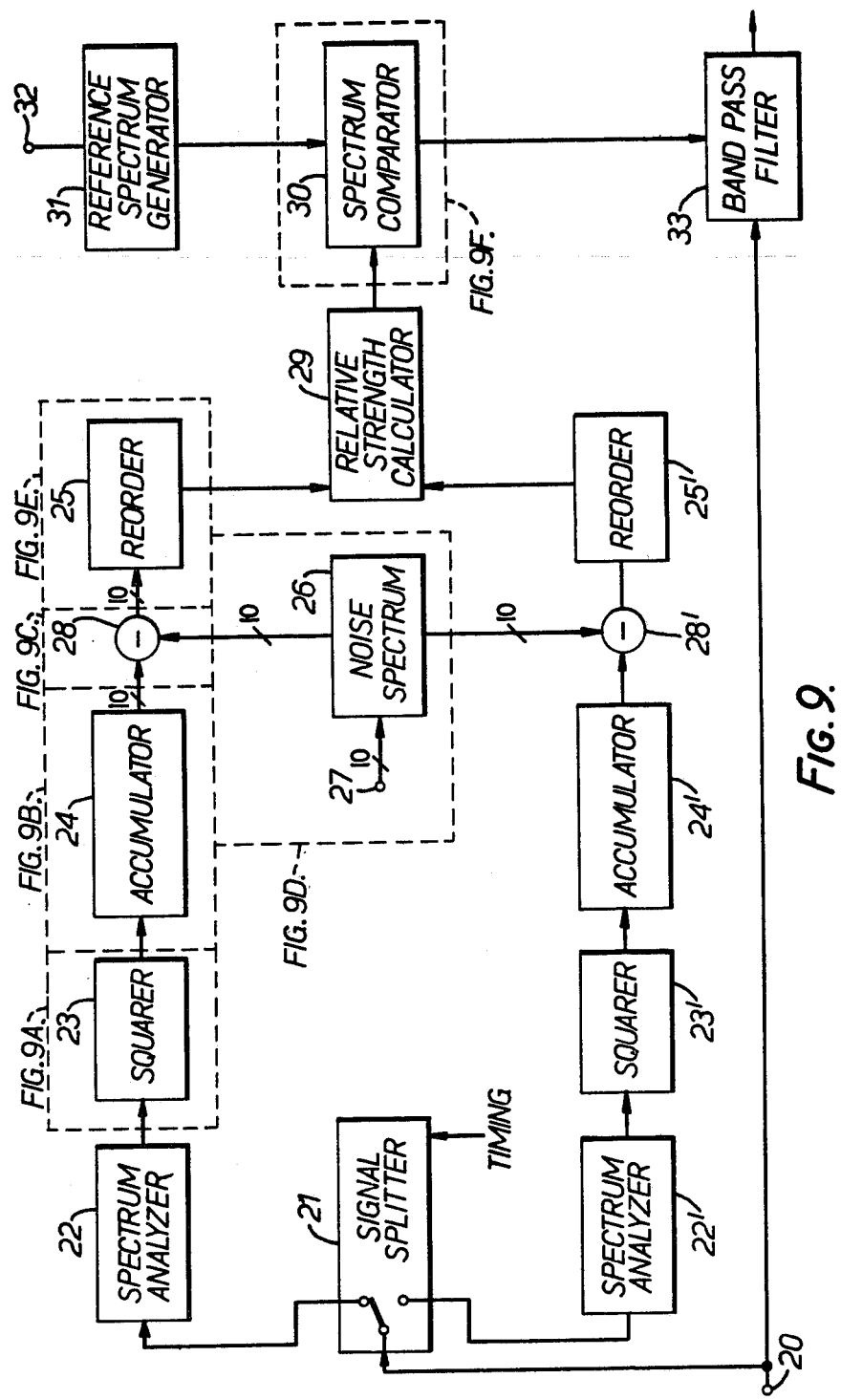

Referring now to FIG. 9, an interval of the incoming signal, this interval containing a number of real and imaginary signal components, is passed by a signal splitter 21 to a spectrum analyzer 22. Circuits for use at 22 are readily available, for example, Fast Fourier Transform Spectrum Analyzer made by Plessy Microsystems Limited model No. SPM/02.

Figure 9A:
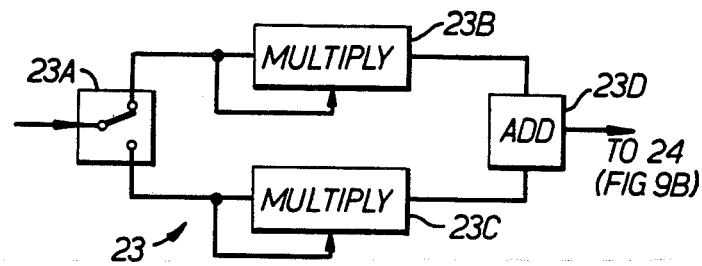
FIGS. 9A to 9F illustrate in more detail various blocks of FIG. 9.

For each of the aforesaid intervals of signals received by the Spectrum Analyzer circuit 22 it produces at its output a series of digital signals arranged in pairs, each pair defining real and imaginary values of a particular frequency component of the received signal. The output of the circuit 22 is passed to a square law device 23 shown in greater detail in FIG. 9A. Referring to FIG. 9A, a switch 23A passes the first signal of each pair (i.e. the real component) to a multiplying circuit 23B; and the second signal of the pair (i.e. the imaginary component) to a multiplying circuit 23C. The circuits 23B and 23C square the respective real and imaginary components and these squared components are added at 23D so that the output represents the square of the amplitude of the appropriate frequency component of the received signal.

Figure 9B:
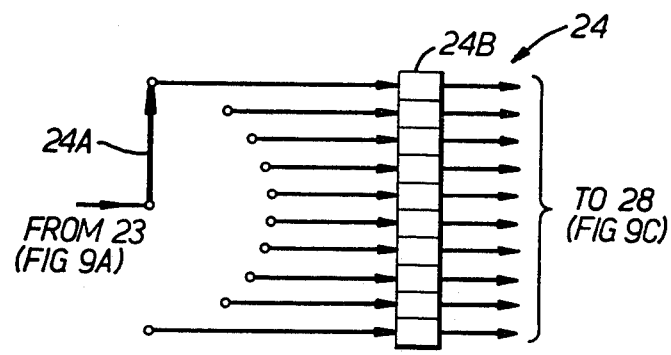

The output of the circuit 23 passes to an accumulator 24 shown in FIG. 9B. Referring to FIG. 9B a switching device 24A sends the different signals representing the amplitudes of different frequency components to different cells of an accumulator 24B. A predetermined number of such signals are added in each cell and the results of such addition are fed to a subtracting circuit 28 shown in FIG. 9C.

Figure 9C:
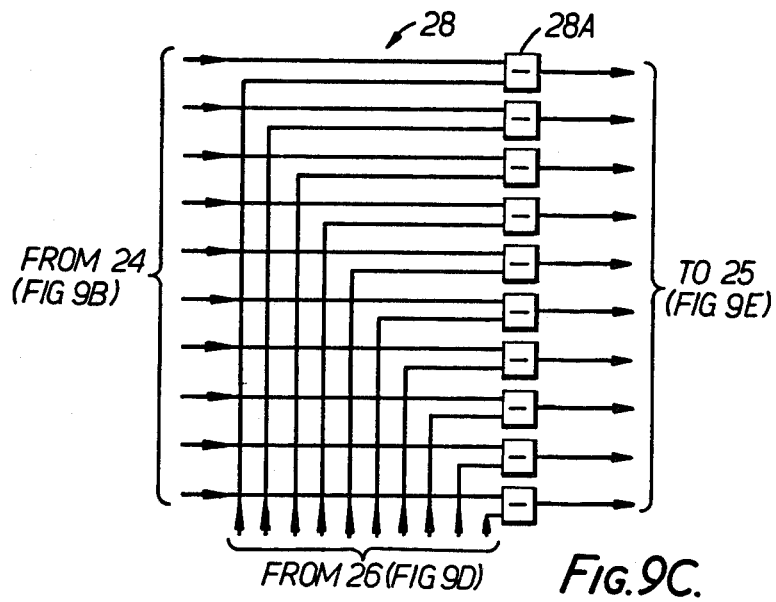
Figure 9D:
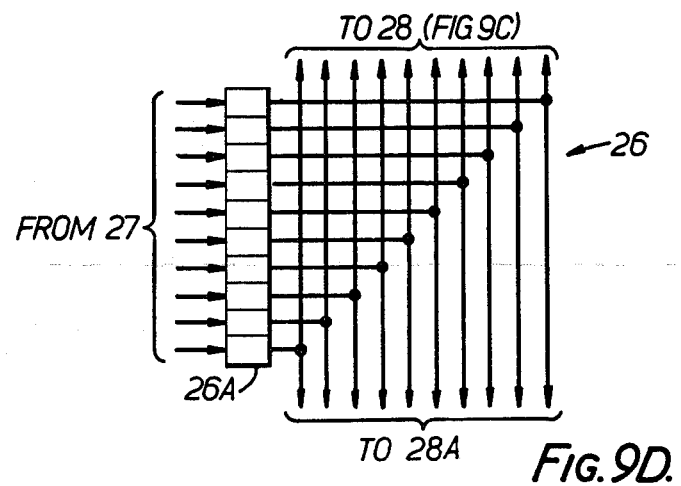

From FIG. 9C it can be seen that the output from each cell of the accumulator 24B is subtracted in a subtracting device such as shown in 28A from a value presented on a second input to the subtracting device, this second input being derived from a noise spectrum generator 26. This noise spectrum generator is shown in FIG. 9D and comprises a plurality of cells, e.g. as shown at 26A, which contain values defining an expected noise spectrum. This expected noise spectrum is derived from data dependent on the antenna specification, the flight parameters and other parameters derived from the received radar signals. The noise spectrum is entered at 27.

Figure 5:
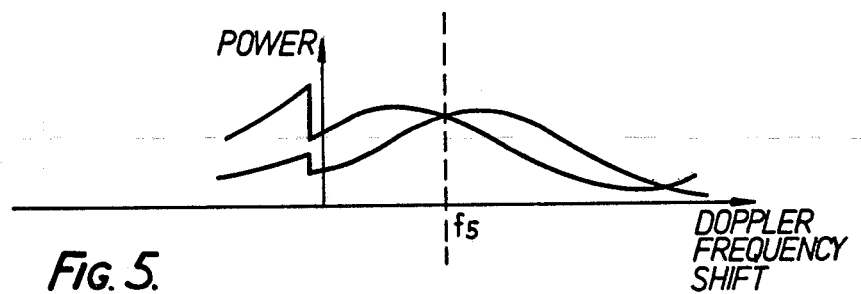
Figure 6:
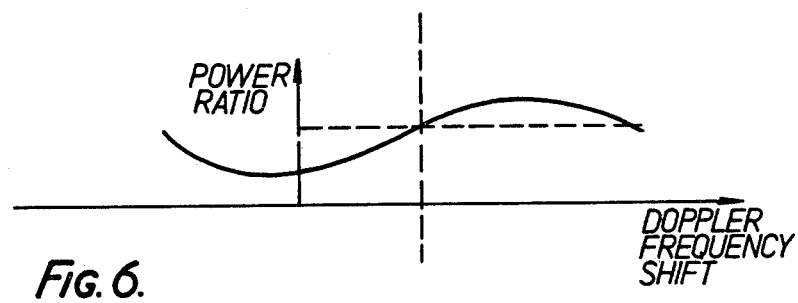
Figure 9E:
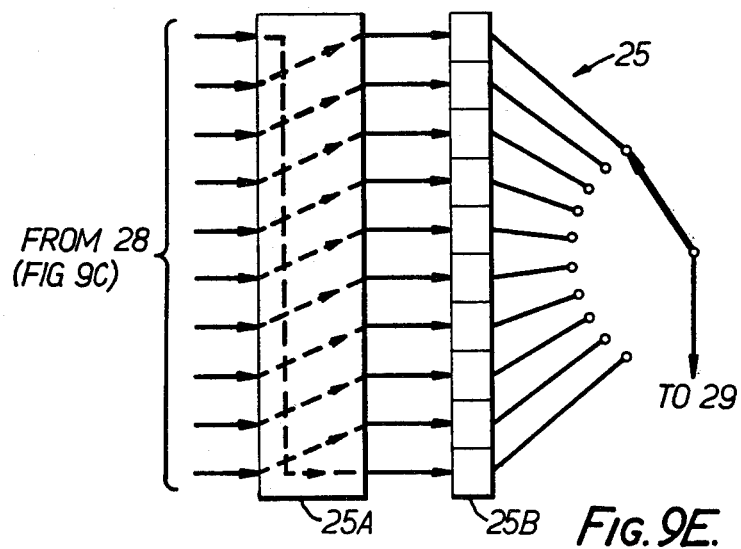

The output of the subtracting circuit 28 is fed to a re-ordering circuit 25 shown in FIG. 9E. This comprises a switching circuit shown schematically at 25A which can be set by means (not shown) to feed each output from the circuit 28 to any chosen cell of a store 25B. In FIG. 9E the switching 25A is illustrated schematically as sending the top output of circuit 28 to the bottom cell of store 25B; and each other output of circuit 28 to the next highest cell of store 25B. This re-ordering operation is equivalent to shifting the frequency down by a predetermined amount. The amount of shifting will be chosen to equal half the Doppler frequency shift, i.e. $f_D/2$ as described earlier herein, corresponding to the delay T between the intervals of signal. The lower output from the timing device 21 is passed through a sequence of circuits 22′, 23′, 24′, 28′, and 25′ similar to those shown at 22, 23, 24, 28 and 25 respectively. The lower output of device 21 is connected to input 20 during the input signal interval following the interval during which input signals were passed to the upper output of this device. However, the re-ordering circuit 25′ is designed so as to shift the frequency upwards instead of downwards. The circuits 25 and 25′ thus bring the spectra into substantial alignment as shown in FIG. 5. The outputs of circuits 25 and 25′ are then subtracted from each other in a relative strength calculator 29. In an alternative circuit this device 29 could be designed to calculate ratio values (or by passing through a log amplifier, decibel ratio values) instead of difference values. Thus the output of circuit 29 is like that shown in FIG. 7 (or, in the said alternative circuit, as shown) in FIG. 6).

Figure 7:
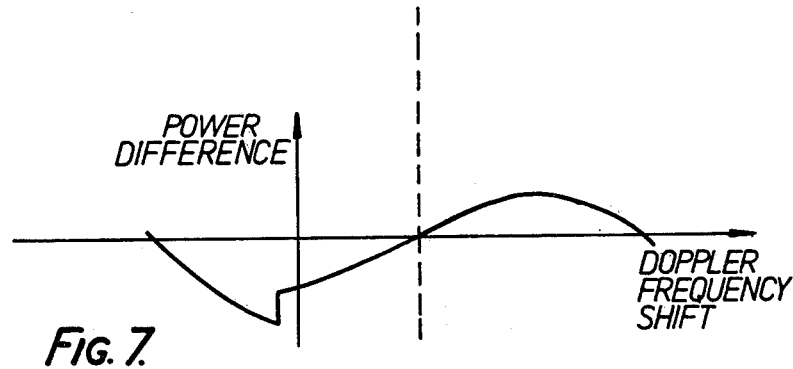
Figure 9F:
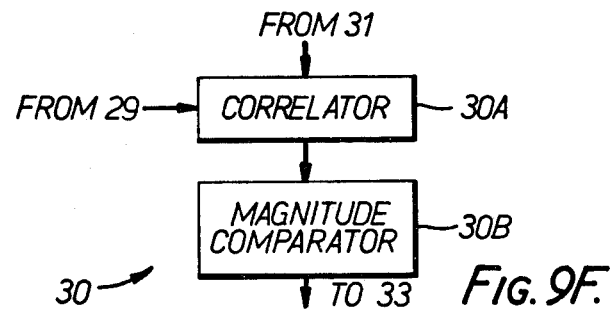

It is likely that the output of circuit 29 will not be like the smooth curve depicted in FIG. 7 since it may be influenced by random noise which the unit 26 is unable to cancel. The output of circuit 29 is therefore compared in a circuit 30 with a reference spectrum generated at 31. The circuit 31 contains a number of reference spectra, an appropriate one of which is chosen according to known parameters. The spectrum comparator 30 is shown in FIG. 9F which shows that the reference spectrum is entered into one input of a correlator 30A which may be of a well known type such as described in A.U.W.E. technical note 338/69 published May 1969. This output spectrum passes to a circuit 30B which produces an output representing the frequency at which the spectrum crosses a preset level, i.e. the frequency shown by the broken vertical line of FIG. 7. The circuit 30B is a conventional comparator circuit and can for example be constituted by the four bit magnitude comparator made by Texas Instruments, model No. SN7485.

The output of circuit 30 controls a filter 33 in such a way that the latter passes only a particular range of frequencies centered on the center frequency. Thus components of the received signal received other than approximately along the boresight of the antenna are removed.

It is believed that this invention will prove to be of considerable value in synthetic aperture radar systems. In such systems the derivation of the center frequency is a necessary requirement to obtain good performance.

It will be appreciated that the particular form of the invention which has been described is only an example of one way in which the invention can be carried out.

Modifications are possible. For example it is conceivable that one may not wish to know the center frequency but would wish to know the frequency associated with some direction offset from the boresight of the antenna. In that case different values would be substituted for the ratio value of unity or the difference value of zero. It is also possible that the flight of the aircraft or other object may not be parallel with the surface from which the radar reflections are received. Also the velocity may not be uniform. Suitable compensating measures could be taken to allow for such deviations.

Figure 1:
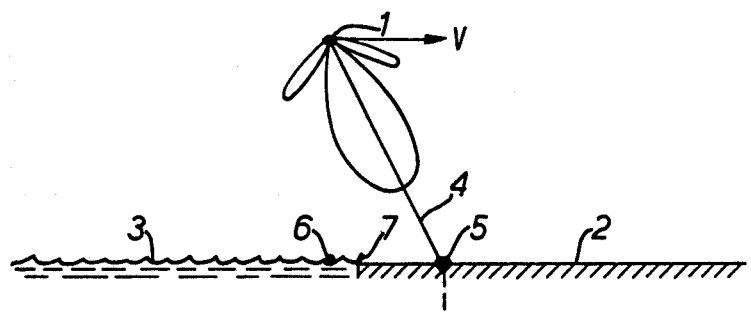
FIG. 1 is a simplified pictorial view of an airborne radar system traveling above the earth's surface.
Figure 2:
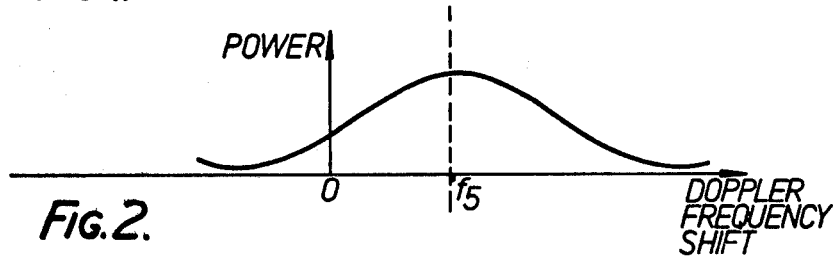
FIGS. 2–7 are diagrams showing received signal power spectra serving to illustrate the principles of the invention.
Figure 3:
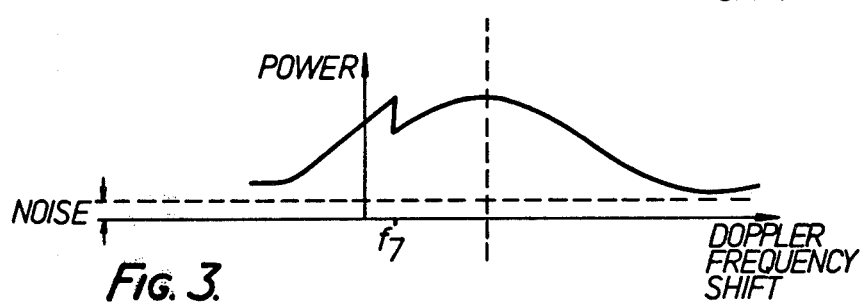
Figure 4:
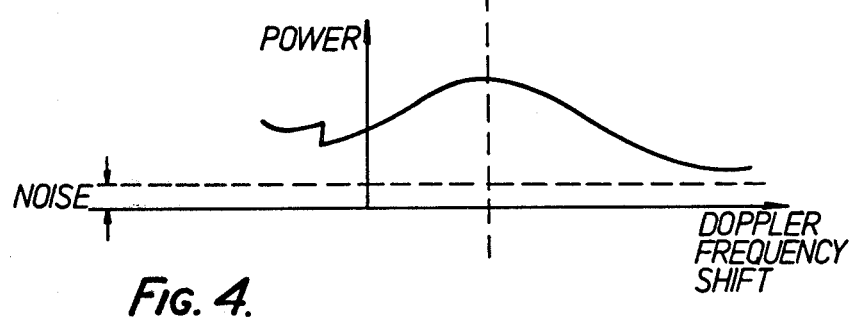

It is also pointed out that the antenna need not necessarily have a simple gain pattern as depicted in FIG. 1. It may have two or more directions of equal maximum gain and it need not be symmetrical about any particular direction.

I claim:

1. A Doppler radar system including an antenna having a main lobe whose aspect is fixed relative to the radar system; means for separating a signal received by the antenna into at least two signal parts reflected at different times from respective different regions defined by said main lobe, said different regions having a common range of target positions; means for analyzing each signal part into components having different Doppler shifts; means for calculating for each said position, a value constituting a measure of the relative strengths of those components of the two signal parts which are derived from reflections off that position; and selecting means for using the calculated values to determine the frequency components of the received signal derived from reflections in a particular direction or range of directions within the said main lobe.

2. A radar system according to claim 1 wherein said means for calculating comprise means for deriving a value constituting a function of a ratio of the relative strengths.

3. A radar system according to claim 1 wherein said means for calculating comprise means for deriving a value constituting a ratio of the strengths in which said selecting means comprise means for selecting those signal components for which the said ratio is within a range including 1.

4. A radar system according to claim 1 wherein said means for calculating comprise means for deriving a value constituting a function of the difference of the relative strengths.

5. A radar system according to claim 1 wherein said means for calculating comprise means for deriving a value constituting the difference of the strengths and in which said selecting means comprise means for selecting those signal components for which the said ratio is within a range including 0.

6. A radar system according to claim 1, 2, 3, 4 or 5 in which the said means for calculating comprise means for selecting signal components having a substantially uniform frequency difference and for calculating the measure of the relative strengths from those components.

7. A radar system according to claim 6 wherein said calculating means comprise means for setting the said frequency difference such that the signal components having the frequency difference are derived from reflections off the same target position.

8. A radar system according to claim 7 in which said selecting means comprises means for comparing the calculated values with a reference spectrum and for deriving as a result of that comparison a signal defining the components to be selected.

9. A radar system according to claim 6 in which said selecting means comprises means for comparing the calculated values with a reference spectrum and for deriving as a result of that comparison a signal defining the components to be selected.

10. A radar system according to claim 1, 2, 3, 4 or 5 in which said selecting means comprises means for comparing the calculated values with a reference spectrum and for deriving as a result of that comparison a signal defining the components to be selected.

* * * * *